United States Patent
Ye et al.

(10) Patent No.: US 12,335,201 B2
(45) Date of Patent: Jun. 17, 2025

(54) COLLISION HANDLING FOR CROSS DIVISION DUPLEX OPERATIONS

(71) Applicant: APPLE INC., Cupertino, CA (US)

(72) Inventors: Chunxuan Ye, Cupertino, CA (US); Dawei Zhang, Cupertino, CA (US); Haitong Sun, Cupertino, CA (US); Hong He, Cupertino, CA (US); Oghenekome Oteri, Cupertino, CA (US); Seyed Ali Akbar Fakoorian, Cupertino, CA (US); Sigen Ye, Cupertino, CA (US); Weidong Yang, Cupertino, CA (US); Wei Zeng, Cupertino, CA (US); Yushu Zhang, Beijing (CN); Chunhai Yao, Beijing (CN)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 17/789,756

(22) PCT Filed: Sep. 24, 2021

(86) PCT No.: PCT/CN2021/120481
§ 371 (c)(1),
(2) Date: Jun. 28, 2022

(87) PCT Pub. No.: WO2023/044818
PCT Pub. Date: Mar. 30, 2023

(65) Prior Publication Data
US 2023/0283446 A1 Sep. 7, 2023

(51) Int. Cl.
*H04L 5/14* (2006.01)
*H04W 72/1268* (2023.01)
(Continued)

(52) U.S. Cl.
CPC .......... *H04L 5/14* (2013.01); *H04W 72/1268* (2013.01); *H04W 72/23* (2023.01); *H04W 72/566* (2023.01)

(58) Field of Classification Search
CPC ....... H04L 5/14; H04L 5/0044; H04L 5/0048; H04L 5/0053; H04L 5/0094; H04W 72/1268; H04W 72/23; H04W 72/566
(Continued)

(56) References Cited

U.S. PATENT DOCUMENTS

| 2017/0332396 A1 | 11/2017 | Liao et al. |
| 2019/0149269 A1 | 5/2019 | Chatterjee et al. |

(Continued)

FOREIGN PATENT DOCUMENTS

| CN | 109803444 A | * 5/2019 |
| CN | 110622451 | 12/2019 |

(Continued)

OTHER PUBLICATIONS

LG Electronics, "Revised WID on Cross Link Interference (CLI) handling and Remote Interference Management (RIM) for NR," 3GPP TSG RAN Meeting #82, RP-182864, Sorrento, Italy, Dec. 10-13, 2018, 5 pages.

(Continued)

*Primary Examiner* — Hashim S Bhatti
*Assistant Examiner* — Oladiran Gideon Olaleye
(74) *Attorney, Agent, or Firm* — Fish & Richardson P.C.

(57) ABSTRACT

A user equipment for cross-division duplex (XDD) operations comprises circuitry configured to perform operations for determining a transmission direction for a slot of a frame structure as being an uplink (UL) slot or a downlink (DL) slot operating in XDD mode based on scheduling data from a base station. The UE is configured to receive scheduling data indicating a switching gap of the frame structure for
(Continued)

switching from DL to UL transmission, determine that the switching gap is smaller than a threshold value to cause a collision between UL transmission and DL reception for a slot, and resolve the collision based on the UL transmission and the DL reception.

20 Claims, 12 Drawing Sheets

(51) Int. Cl.
  *H04W 72/23* (2023.01)
  *H04W 72/566* (2023.01)
(58) Field of Classification Search
  USPC .......................................................... 370/329
  See application file for complete search history.

(56) References Cited

U.S. PATENT DOCUMENTS

| | | | |
|---|---|---|---|
| 2020/0052811 A1 | 2/2020 | Li et al. | |
| 2022/0069856 A1* | 3/2022 | Chen | H03H 15/00 |
| 2023/0007599 A1* | 1/2023 | Lim | H04L 5/0048 |
| 2023/0045905 A1* | 2/2023 | Lim | H04W 8/24 |
| 2023/0055304 A1* | 2/2023 | Shim | H04W 72/542 |
| 2023/0057558 A1* | 2/2023 | Lim | H04L 1/08 |
| 2024/0259153 A1* | 8/2024 | Su | H04L 5/0051 |

FOREIGN PATENT DOCUMENTS

| | | |
|---|---|---|
| CN | 112534759 | 3/2021 |
| WO | WO 2015141770 | 9/2015 |
| WO | WO 2021066441 | 4/2021 |
| WO | WO 2021086116 | 5/2021 |
| WO | WO 2021141444 | 7/2021 |

OTHER PUBLICATIONS

Nokia et al., "UCI enhancements maintenance: Conflict between the first PUCCH repetition and semi-static configuration in Rel-15/16," 3GPP TSG RAN WG1 #106-e, R1-2107555, Aug. 27, 2021, 1 page.
PCT International Search Report and Written Opinion in International Appln. No. PCT/CN2021/120481, dated Mar. 29, 2022, 10 pages.
CATT, "Discussion on PUSCH resource collision and Dl Sps enhancement," 3GPP Tsg Ran WG1 Meeting #99, R1-1912174, Reno, USA, Nov. 18-22, 2019, 7 pages.
Huawei et al., "Considerations on the mapping between PDCCH occasion and beam for Osi," 3GPP TSG RAN WG2 Meeting #AH-1807, R2-1810126, Montreal, Canada, Jul. 2-6, 2018, 2 pages.
Intel Corporation, "On HD-FDD support for RedCap devices," 3GPP TSG RAN WG1 Meeting #104 E, R1-2103040, e-Meeting, Apr. 12-20, 2021, 6 pages.

* cited by examiner

Mixed XDD in TDD band

COLLISION HANDLING FOR CROSS DIVISION DUPLEX OPERATIONS

CLAIM OF PRIORITY

This application claims priority under 35 U.S.C. § 371 to International Application No. PCT/CN2021/120481, filed on Sep. 24, 2021, the entire contents of which are hereby incorporated by reference.

TECHNICAL FIELD

This disclosure relates generally to wireless communications.

BACKGROUND

For fifth generation (5G) new radio (NR) networks, cross-division duplex (XDD) enhances uplink (UL) coverage in time division duplex (TDD) carriers by utilizing self-interference cancellation (SIC) capability at a base station. With XDD, it is possible to combine TDD's ability to efficiently handle asymmetric UL and downlink (DL) traffic with frequency division duplex's coverage advantage. From a perspective of a user equipment (UE), allocated physical resource blocks (PRBs) are for UL or DL, but not both at the same time. From a base station perspective (e.g., a next generation node gNB, evolved node eNB, and so forth), some PRBs in a slot are for UL transmission and other PRBs are for DL transmission.

SUMMARY

This application describes data processing systems and processes for XDD operations. For XDD operations, some PRBs in a DL slot are instead reserved for UL transmission. This application describes how the UE determines a transmission direction for each of the PRBs of a slot if there is a collision from UL and DL scheduling. This application describes how the UE handles collisions when there is a DL to UL switching gap for XDD and a collision between DL reception and UL transmission.

Generally, the UE determines transmission direction for different collision scenarios, as described herein. For example, a physical downlink control channel (PDCCH) monitoring occasion may conflict with a physical uplink transmission, such as a physical uplink shared channel (PUSCH), a physical uplink control channel (PUCCH), a sounding reference signal (SRS), a physical random access channel (PRACH) transmission, and so forth in a slot operating in the XDD mode. In another example, a synchronization signal block (SSB)/physical broadcast channel (PBCH) block may conflict with PUSCH, PUCCH, SRS, or PRACH transmissions. In another example, a DL grant (DG) PDSCH transmission may conflict with a configured UL grant (CG) or DG PUSCH, PUCCH, SRS, or PRACH transmission. In another example, a CG PDSCH operation can conflict with a CG or DG PUSCH, PUCCH, SRS, or PRACH transmission. These are example scenarios for collisions during operation of an XDD mode. For each collision scenario, the UE operates in accordance with a defined transmission direction for that particular scenario, as described herein.

To handle collisions when there is a DL to UL switching gap for XDD and a collision between DL reception and UL transmission, the UE is configured to operate in accordance with one or more of the following solutions. The UE receives switching gap (GP) data. The switching gap data indicates a gap value (e.g., in milliseconds) for which bandwidth path switching (BWP) may occur. The UE then does not expect to receive the DL signal/channel transmission and transmits the UL signal/channel if the gap is smaller than the gap value indicated by the switching gap data. In another example, the UE assumes that there is no DL transmission that overlaps with the UL transmission. In another example, when the measurement gap value is below a threshold value, the UE expects an UL and DL collision. The UE refers to a collision priority indicating an UL transmission or DL reception priority for each collision scenario.

The systems and processes described in this document enable one or more of the following advantages, among other advantages. The collision handling for XDD operations supports Cross Link Interference (CLI) handling and Remote Interference Management (RIM) for NR. Collision handling as described herein supports cross-link interference mitigation to support flexible resource adaptation for unpaired NR cells by specifying cross-link interference measurements and reporting at a UE (e.g., CLI-Received Signal Strength Indicator (RSSI) and/or CLI-Reference Signal Received Power (RSRP)). Collision handling as described herein supports cross-link interference mitigation to support flexible resource adaptation for unpaired NR cells by specifying network coordination mechanism(s) including at least exchange of intended DL/UL configuration. The collision handling as described herein supports cross-link interference mitigation to support flexible resource adaptation for unpaired NR cells by specifying conditions of coexistence among different operators in adjacent channels. The disclosed techniques are realized by one or more implementations, which include the following.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
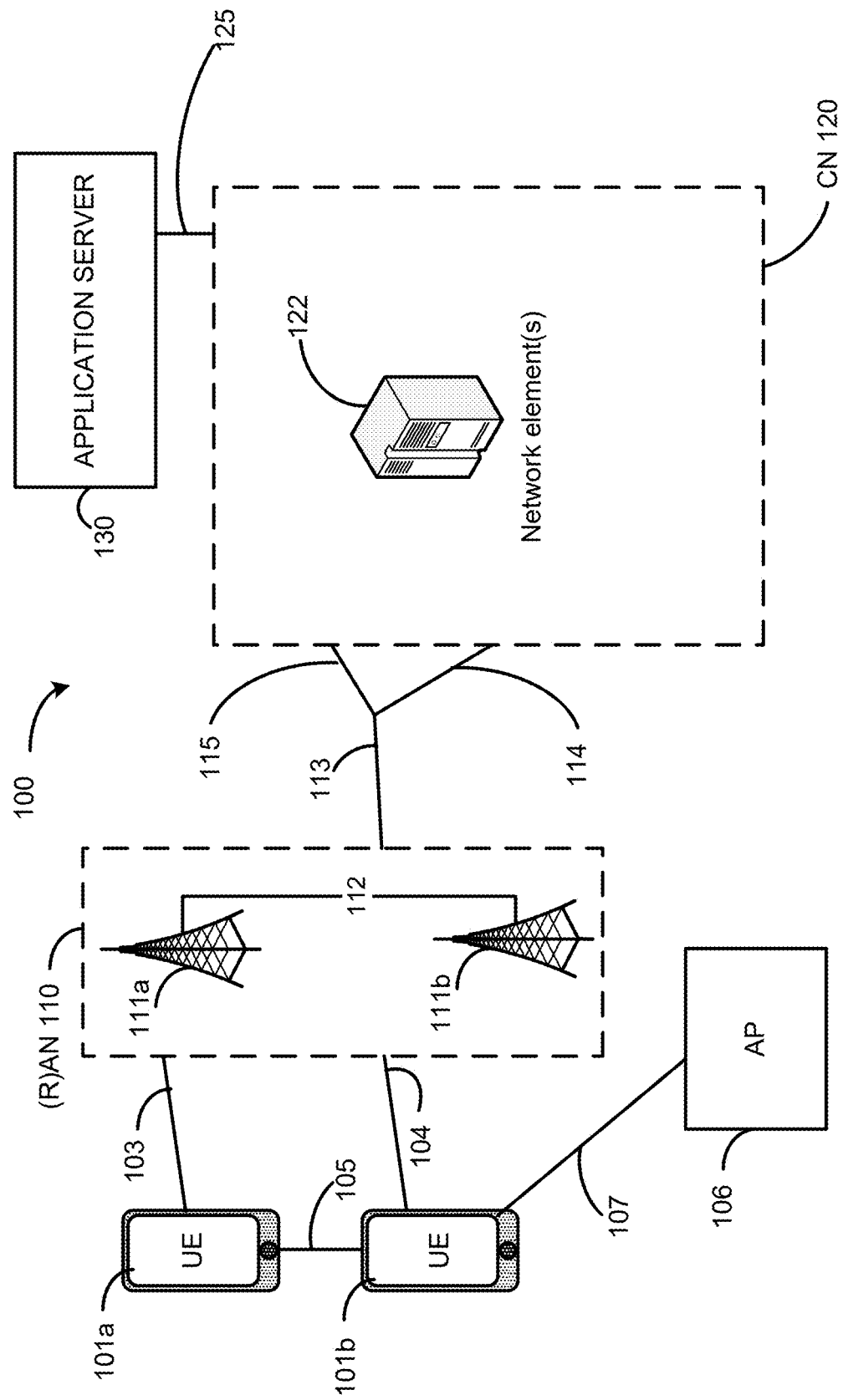
FIG. 1 illustrates an example wireless communication system, according to various implementations herein.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

The UEs 101 may be configured to connect, for example, communicatively couple, with RAN 110. In implementations, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various implementations, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various implementations, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 111 may be implemented as one or more software entities running on server computers as part of a virtual network, which may be referred to as a CRAN and/or a virtual baseband unit pool (vBBUP). In these implementations, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111.

Any of the RAN nodes 111 can terminate the air interface protocol and can be the first point of contact for the UEs 101.

In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In implementations, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the implementations is not limited in this respect. The OFDM signals can comprise a plurality of orthogonal subcarriers.

In some implementations, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various implementations, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some implementations may use concepts for resource allocation for control channel information that are an extension of the above-described concepts. For example, some implementations may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In implementations where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In implementations where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this implementation, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some implementations, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In implementations, the CN 120 may be a 5GC (referred to as "5GC 120" or the like), and the RAN 110 may be connected with the CN 120 via an NG interface 113. In implementations, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs.

In implementations, the CN 120 may be a 5G CN (referred to as "5GC 120" or the like), while in other implementations, the CN 120 may be an EPC). Where CN 120 is an EPC (referred to as "EPC 120" or the like), the RAN 110 may be connected with the CN 120 via an S1 interface 113. In implementations, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
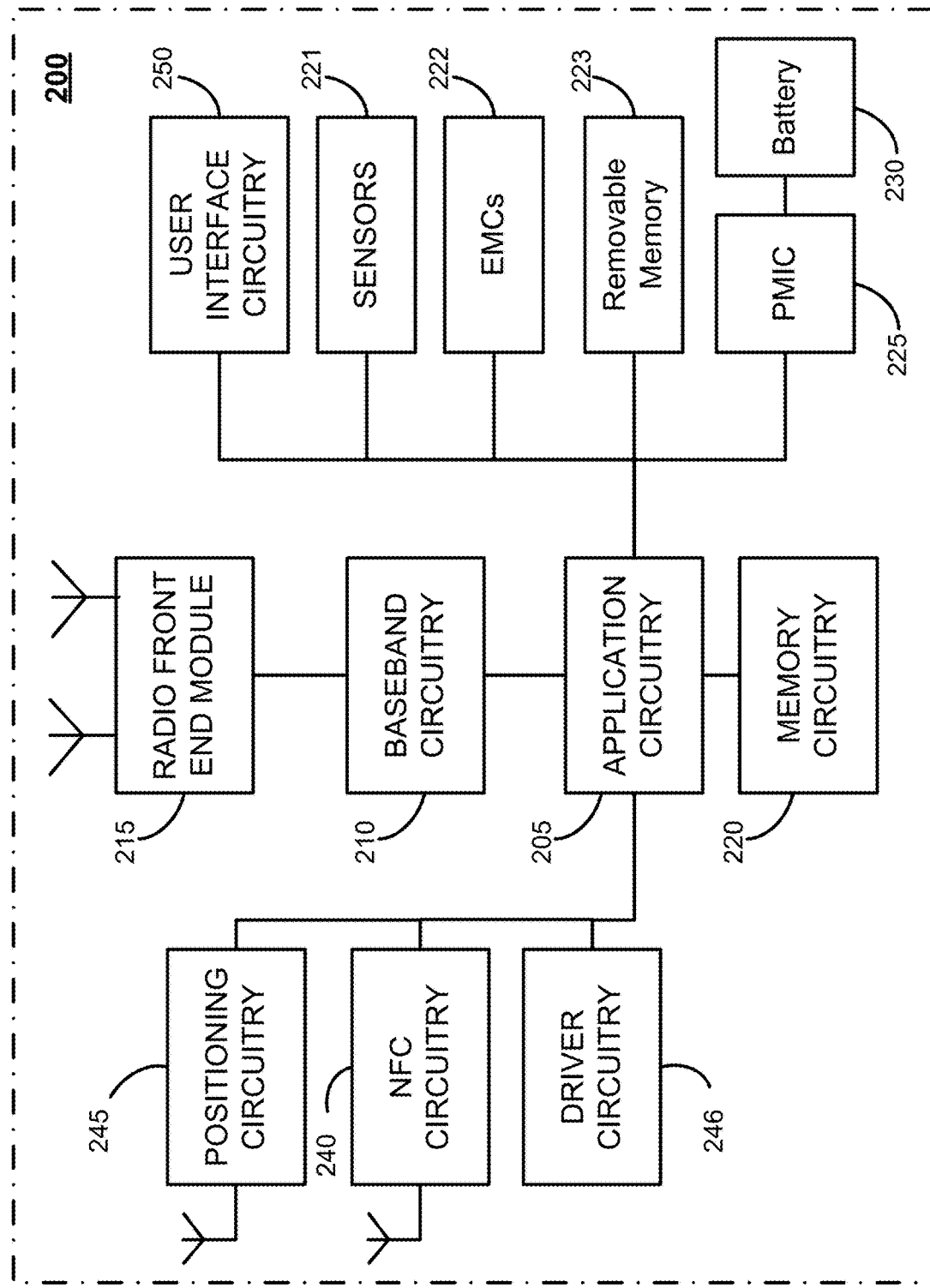
FIG. 2 illustrates an example of a computing device in accordance with various implementations.

FIG. 2 illustrates an example of a platform 200 (or "device 200") in accordance with various implementations. In implementations, the computer platform 200 may be suitable for use as UEs 101, application servers, and/or any other element/device discussed herein. The platform 200 may include any combinations of the components shown in the example. The components of platform 200 may be implemented as integrated circuits (ICs), portions thereof, discrete electronic devices, or other modules, logic, hardware, software, firmware, or a combination thereof adapted in the computer platform 200, or as components otherwise incorporated within a chassis of a larger system. The block diagram of FIG. 2 is intended to show a high level view of components of the computer platform 200. However, some of the components shown may be omitted, additional components may be present, and different arrangement of the components shown may occur in other implementations.

Application circuitry 205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports.

The processor(s) of application circuitry may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry may comprise, or may be, a special-purpose processor/controller to operate according to the various implementations herein.

As examples, the processor(s) of application circuitry 205 may include an Apple A-series processor. The processors of the application circuitry 205 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 205 may be a part of a system on a chip (SoC) in which the application circuitry 205 and other components are formed into a single integrated circuit.

Additionally or alternatively, application circuitry 205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like.

The baseband circuitry 210 may be implemented, for example, as a solder-down substrate including one or more integrated circuits, a single packaged integrated circuit soldered to a main circuit board or a multi-chip module containing two or more integrated circuits.

The RFEMs 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include any number and type of memory devices used to provide for a given amount of system memory. As examples, the memory circuitry 220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc.

Removable memory circuitry 223 may include devices, circuitry, enclosures/housings, ports or receptacles, etc. Used to couple portable data storage devices with the platform 200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 200 may also include interface circuitry (not shown) that is used to connect external devices with the platform 200. The external devices connected to the platform 200 via the interface circuitry include sensor circuitry 221 and electro-mechanical components (EMCs) 222, as well as removable memory devices coupled to removable memory circuitry 223.

The sensor circuitry 221 include devices, modules, or subsystems whose purpose is to detect events or changes in its environment and send the information (sensor data) about the detected events to some other a device, module, subsystem, etc. Examples of such sensors include, inter alia, inertia measurement units (IMIUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 222 include devices, modules, or subsystems whose purpose is to enable platform 200 to change its state, position, and/or orientation, or move or control a mechanism or (sub)system. Additionally, EMCs 222 may be configured to generate and send messages/signaling to other components of the platform 200 to indicate a current state of the EMCs 222.

In some implementations, the interface circuitry may connect the platform 200 with positioning circuitry 245. The positioning circuitry 245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like.

In some implementations, the interface circuitry may connect the platform 200 with Near-Field Communication (NFC) circuitry 240. NFC circuitry 240 is configured to provide contactless, short-range communications based on radio frequency identification (RFID) standards, wherein magnetic field induction is used to enable communication between NFC circuitry 240 and NFC-enabled devices external to the platform 200 (e.g., an "NFC touchpoint").

The driver circuitry 246 may include software and hardware elements that operate to control particular devices that are embedded in the platform 200, attached to the platform 200, or otherwise communicatively coupled with the platform 200. The driver circuitry 246 may include individual drivers allowing other components of the platform 200 to interact with or control various input/output (I/O) devices that may be present within, or connected to, the platform 200.

The power management integrated circuitry (PMIC) 225 (also referred to as "power management circuitry 225") may manage power provided to various components of the platform 200. In particular, with respect to the baseband circuitry 210, the PMIC 225 may control power-source selection, voltage scaling, battery charging, or DC-to-DC conversion. The PMIC 225 may often be included when the platform 200 is capable of being powered by a battery 230.

In some implementations, the PMIC 225 may control, or otherwise be part of, various power saving mechanisms of the platform 200. For example, if the platform 200 is in an RRC_Connected state, where it is still connected to the RAN node as it expects to receive traffic shortly, then it may enter a state known as Discontinuous Reception Mode (DRX) after a period of inactivity. During this state, the platform 200 may power down for brief intervals of time and thus save power. If there is no data traffic activity for an extended period of time, then the platform 200 may transition off to an RRC_Idle state, where it disconnects from the network and does not perform operations such as channel quality feedback, handover, etc. The platform 200 goes into a very low power state and it performs paging where again it periodically wakes up to listen to the network and then powers down again. The platform 200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 230 may power the platform 200, although in some examples the platform 200 may be mounted deployed in a fixed location, and may have a power supply coupled to an electrical grid. The battery 230 may be a lithium ion battery, a metal-air battery, such as a zinc-air battery, an aluminum-air battery, a lithium-air battery, and the like. In some implementations, such as in V2X applications, the battery 230 may be a typical lead-acid automotive battery.

A power block, or other power supply coupled to an electrical grid may be coupled with the BMS to charge the battery 230. In some examples, a power block may be replaced with a wireless power receiver to obtain the power wirelessly, for example, through a loop antenna in the computer platform 200.

User interface circuitry 250 includes various input/output (I/O) devices present within, or connected to, the platform 200, and includes one or more user interfaces designed to enable user interaction with the platform 200 and/or peripheral component interfaces designed to enable peripheral component interaction with the platform 200.

Figure 3:
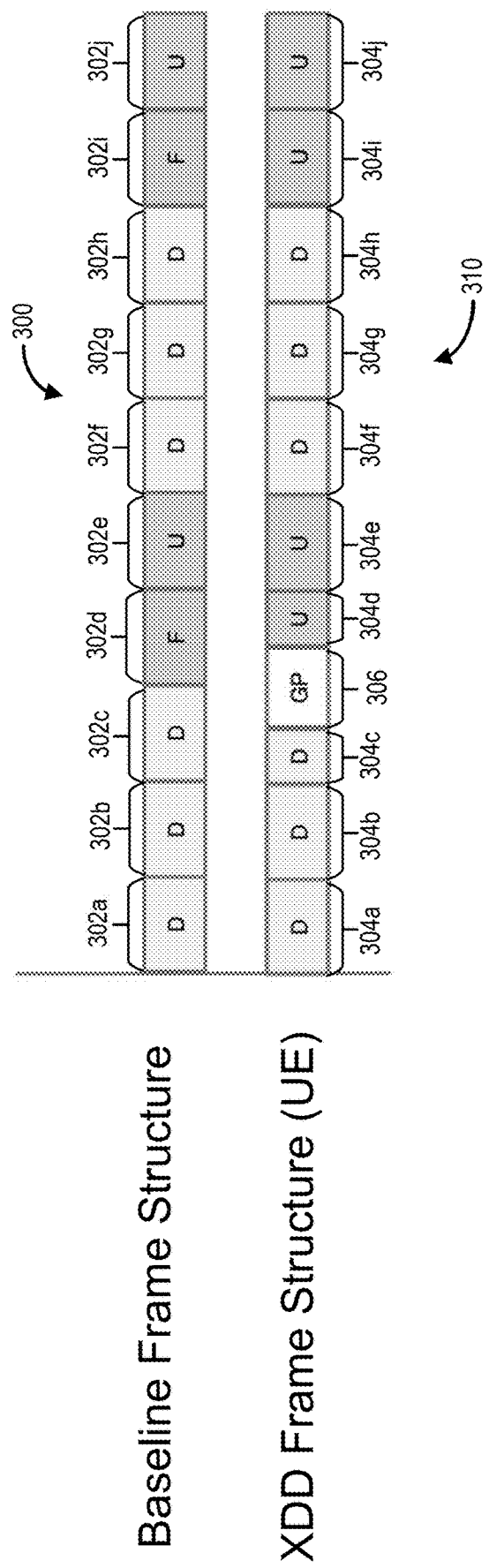
FIG. 3 shows an example of a frame structure for a UE, such as UEs 101a-b described in relation to FIGS. 1-2.

FIG. 3 shows an example of frame structures 300, 310 for a UE, such as UEs 101a-b described in relation to FIGS. 1-2. The frame structure 300 represents a sequence of slots 302a-j. The frame structure 300 is shown as a baseline frame structure for NR. Each slot indicates a transmission direction. A transmission direction indicates whether the UE receives data (DL) or transmits data (UL). The slots include UL slots 302e, 302j (e.g., slots labeled U). The frame structure 300 includes DL slots 302a-c and 302f-h (e.g., slots labeled D). The frame structure includes flexible slots 302d and 302i (e.g., slots labeled F). For the UE, transmissions are performed on UL slots, and reception is performed on DL slots. The flexible slots 302d, 302i enable either transmission or reception of data by the UE. The transmission direction for each flexible slot 302d, 302i is indicated dynamically by slot format indication (SFI) data. The flexible slot can enable XDD operation if enabled for the UE. Generally, dynamic SFI is optional for the UE.

To enable XDD for UEs that do not support dynamic SFI, the frame structure 310 is adopted in which no flexible slots are included. This enables a number of PRBs in a given DL slot for UL transmission, or a given UL slot for DL reception. The omission of flexible slots in frame structure 310 enables XDD for the UE without requiring dynamic SFI. The frame structure 310 includes slots 304a-j. Similar to structure 300, slots 304a-304c and 304f-304h include DL slots (e.g., slots labeled D). Slots 304d-304e and 304i-304j are UL slots (e.g., slots labeled U). Switching gap 306 (labeled GP) is a gap in which the UE is not configured for either DL reception or UL transmission. The gap 306 is a time allowed to enable UE switching between DL reception and UL transmission.

Generally for XDD operations, a transmission direction is per PRBs or PRB group. From UE side, for each a slot, there is only one transmission direction assumed. The UE determines whether a given slot is a UL slot or a DL slot if there is collision from UL and DL scheduling. The UE determines that the UL slot is a UL slot or a DL slot based on a type of the transmission or reception operation and what time is available for switching.

The switching gap 306 is provided to enable switching from DL to UL operation for the UE during XDD operation of the UE. During XDD operation, the UE can switch from DL to UL operation between any two consecutive slots or within a slot. The switching gap 306 can be at any position in the frame structure 310. For example, the switching gap 306 can be positioned at either a UL slot, a DL slot, or span across a slot boundary. Switching gap 306 in frame structure 310 spans across a slot boundary between DL slot 304c and UL slot 304d. Other positions for the switching gap 306 are possible.

Figure 4:
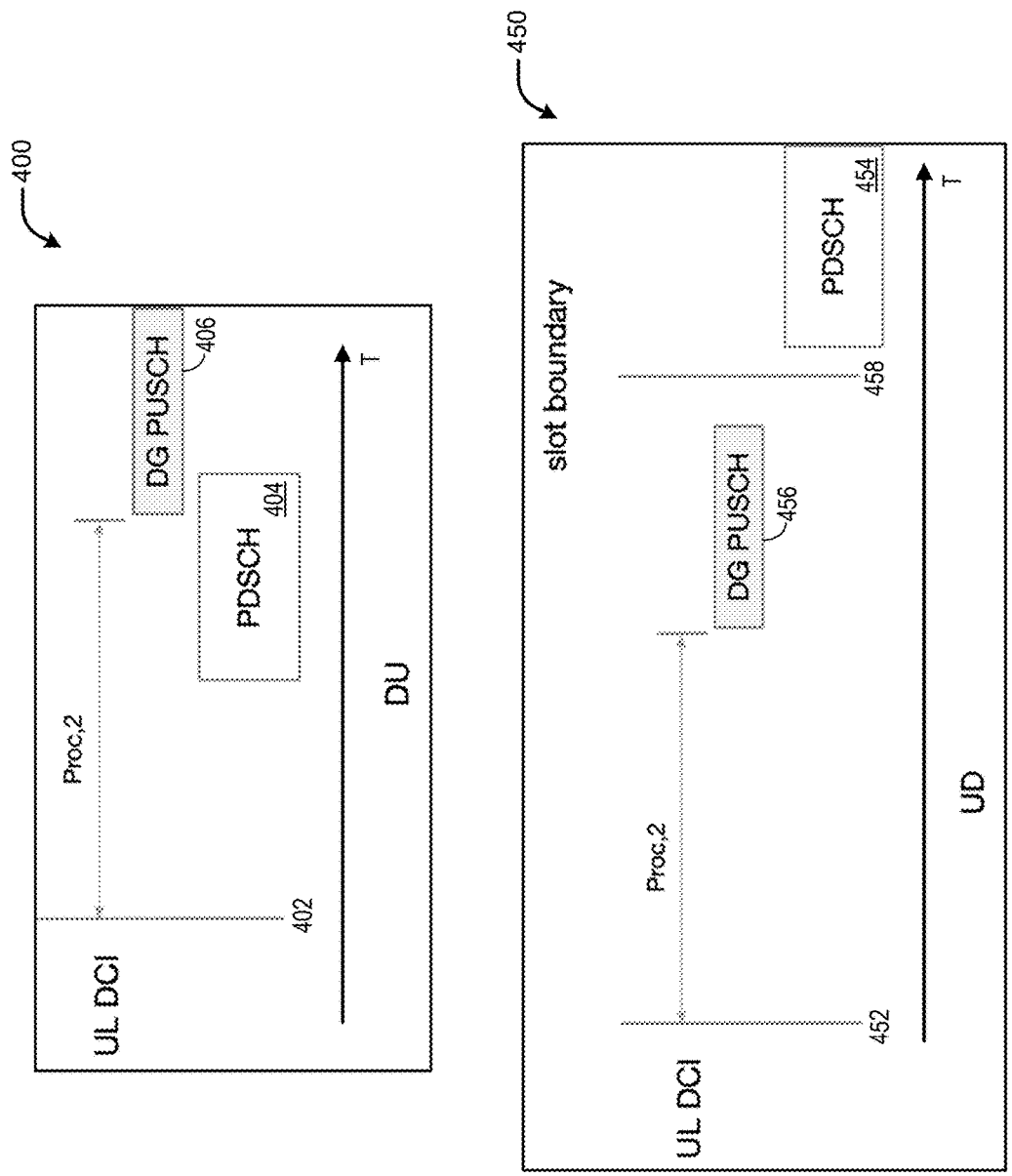
FIG. 4 shows examples of UE switching scenarios between UL transmission and DL reception (e.g., for downlink control information (DCI)) for the UE described in relation to FIGS. 1-2.

FIG. 4 shows examples of UE switching scenarios between UL transmission and DL reception (e.g., for DCI) for the UE described in relation to FIGS. 1-2. The DL to UL switching scenario 400 (also called a DU scenario) includes a switch from DL reception to UL transmission for the UE. A slot boundary 402 defines the beginning of a DL slot for the UE. A UE procedure (marked Proc 2) includes a PDSCH operation 404. The PDSCH operation 404 conflicts with a DG PUSCH operation 406. The UL to DL switching scenario 450 (also called a UD scenario) includes a switch from UL transmission to DL reception for the UE. A slot boundary 452 defines the beginning of an UL slot for the UE, and a slot boundary 458 defines the end of that UL slot. A preparation time (marked Proc, 2 or Tproc, 2) is the time after UE receives the last symbol of the DCI with UL grant to the time that the first symbol of PUSCH 456 can be transmitted. There is no collision in the UD scenario 450 because of a timing advance (TA) for the UL transmission and because of propagation delay for the DL reception. Therefore, collision handling is performed by the UE in the DU scenario 400 to enable XDD operation.

Figure 5A:
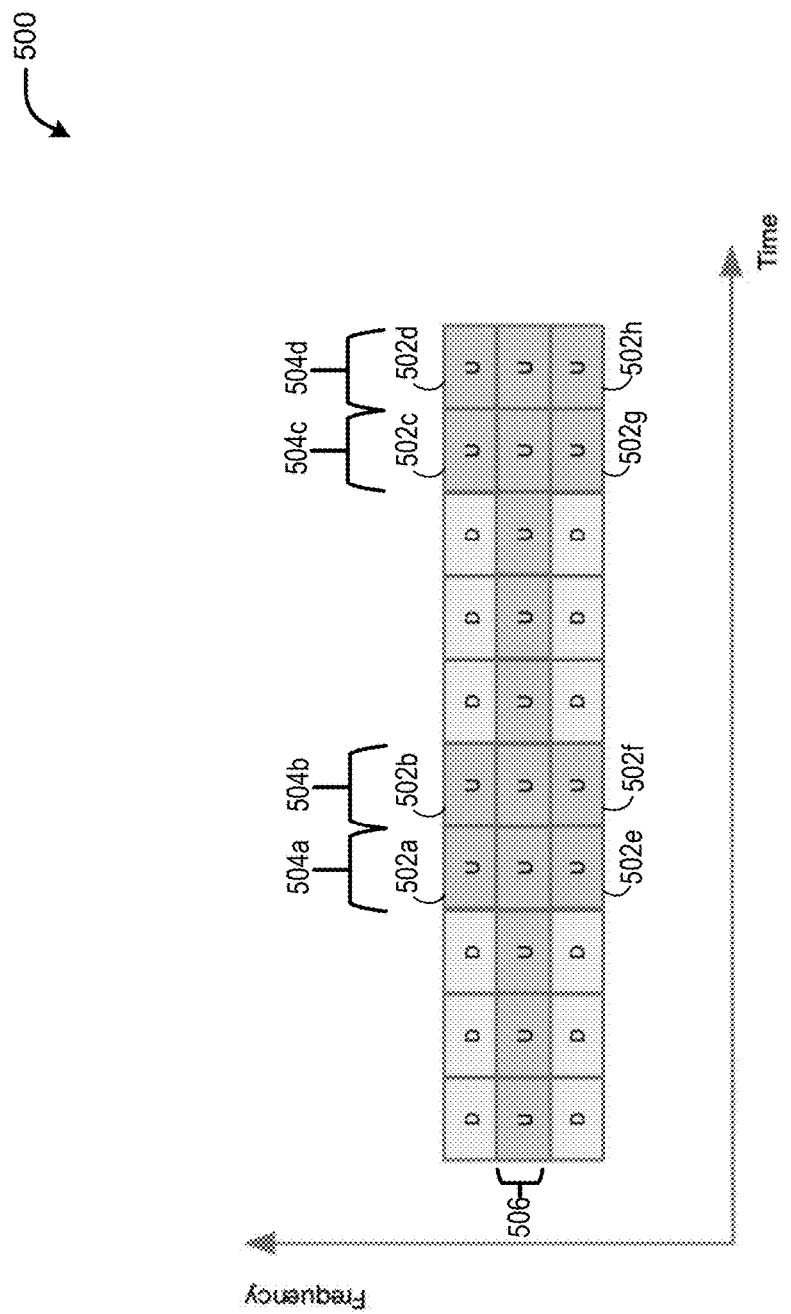
FIGS. 5A, 5B, and 5C show example frame structures representing XDD structure for NR TDD.
Figure 5B:
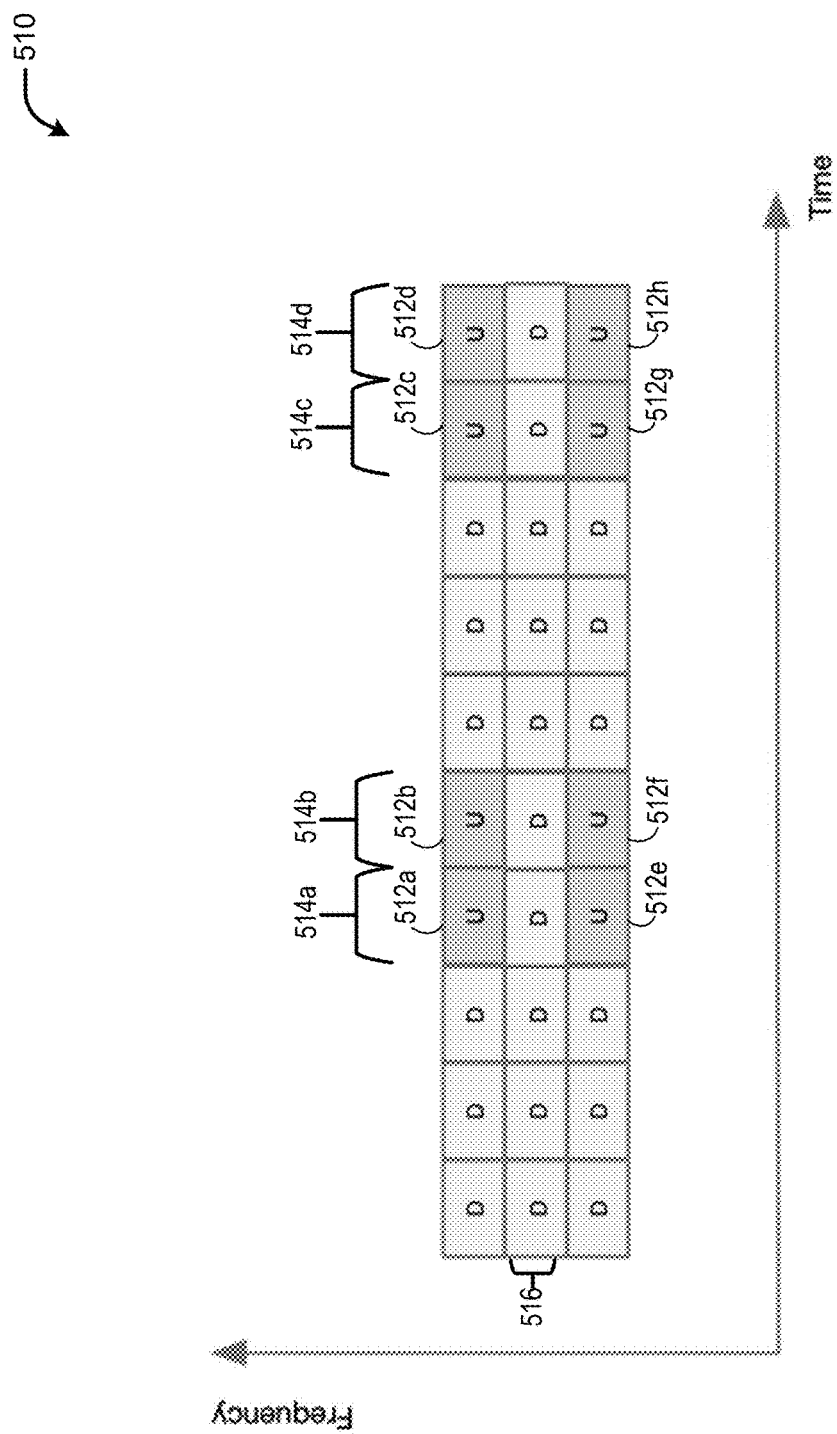
Figure 5C:
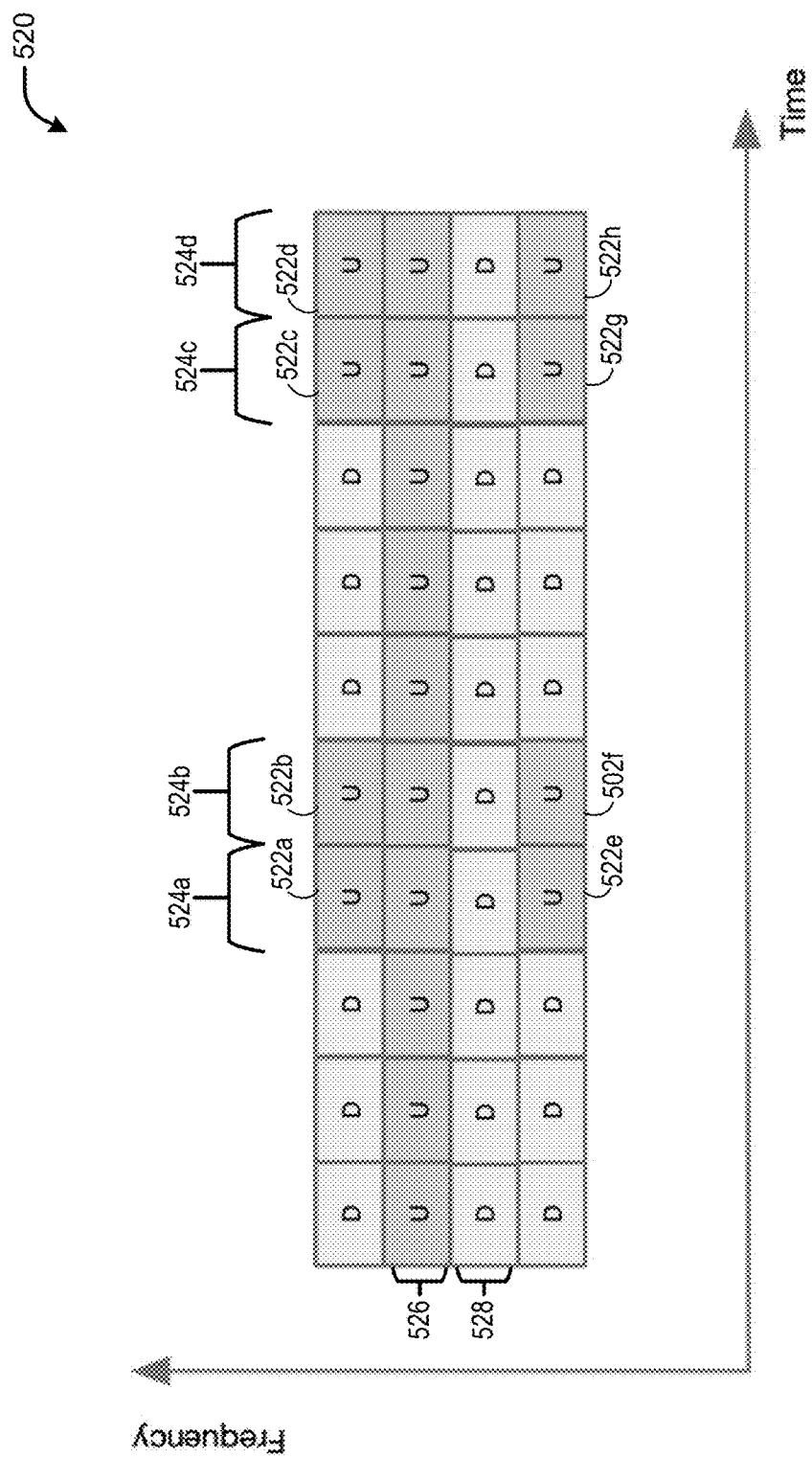

FIGS. 5A, 5B, and 5C show example frame structures 500, 510, and 520 representing XDD structure for NR TDD. Frame structure 500 shows a UL-driven XDD frame structure including a sequence of DL and UL slots for XDD operations in the TDD band for the UE, each slot including three PRBs. Frame structure 510 shows a DL-driven XDD frame structure including a sequence of DL and UL slots for XDD operations in the TDD band for the UE each slot including three PRBs. Frame structure 520 shows a mixed UL and DL XDD frame structure including a sequence of DL and UL slots for XDD operations in the TDD band for the UE, each slot including three PRBs. The UE includes, for example, one of UEs 101a-b previously described in relation to FIGS. 1-4. Frame structures 500, 510, and 520 are illustrative only, and various configurations of the PRBs and slots are possible including various arrangements of UL and DL designated PRBs.

For XDD operations, the UE is configured to use at least one PRB from a DL slot for UL transmission. Alternatively or additionally, the UE is configured to use at least one PRB from a UL slot for DL reception. For UL-driven XDD, the DL PRBs are switched to UL PRBs, and PRBs of another frequency band 506 are unchanged and are each configured for UL transmission. As shown in frame structure 500, several PRBs, such as PRBs 502a-502h, are taken from DL slot and used UL transmission. Slots 504a-d are thus configured for XDD operation, in which the frequency band 506 is unchanged as an UL transmission for each slot. The UE can switch PRBs of a DL slot to UL to improve an UL coverage for the UE and reduce a DL feedback delay for the UE. In some implementations, the UE is configured to switch UL PRBs to DL PRBs. This assists the base station scheduling strategy, such as the high priority PSDCH is coming in the UL slot or current load is DL heavy, gNB need to more DL resources to transmit the PDSCH.

For DL-driven XDD, the DL PRBs are switched to UL PRBs, and PRBs of another frequency band 516 are unchanged and are each configured for DL reception. As shown in frame structure 510 of FIG. 5B, PRBs 512a-h are switched from DL reception to UL transmission. Slots 514a-d are thus configured for XDD operation.

For mixed XDD, the DL PRBs are switched to UL PRBs, and PRBs of another frequency band 526 are unchanged and are each configured for UL transmission. Additionally, the PRBs of yet another frequency band 528 are unchanged and configured for DL reception. The UE is therefore configured to perform XDD operations when frequency bands 526, 528 are scheduled for respective UL and DL operations. As shown in frame structure 520 of FIG. 5C, PRBs 522a-h are switched from UL reception to DL transmission. Slots 524a-d are thus configured for XDD operation.

The transmission direction for PRBs are indicated as follows. In a first example, the transmission direction for the PRBs is indicated by Radio Resource Control (RRC) signaling or similar UE-dedicated signaling. The RRC signaling indicates a number of PRBs and respective locations of the PRBs for DL reception that are changed from an UL slot for the frame structure. For example, the RRC messaging indicates a PRB offset relative the start PRB of a UE dedicated bandwidth part (BWP), which includes a set of contiguous RBs configured inside a channel bandwidth. The RRC signaling can include data representing a number of PRBs for UL transmission from DL slot and locations of those PRBs in in the slot (e.g., the corresponding RB frequencies). The RRC signaling can specify one or more guard PRBs between DL PRBs and UL PRBs. A guard PRB includes a resource block for which the UE is not scheduled either an UL transmission or a DL reception. The guard PRB provides a gap between UL and DL switching for XDD to help prevent collisions. The RRC signaling includes a bitmap that indicates, in a time domain, which slot(s) are enabled to perform an XDD operation for the UE.

Alternatively or additionally, the UE is configured to indicate the slots for XDD operation by a scheduling-based PRB allocation. For example, a number of PRBs and locations of those PRBs in the frame structures 500, 510, 520 are configured by UL or DL scheduling. For example, for UL transmission in a DL slot, the base station scheduling (e.g., gNB scheduling) controls whether there is UL transmission in the DL slot for the UE. In another example, for DL reception in a UL slot, the base station scheduling (e.g., gNB scheduling) controls whether there is DL reception in a UL slot.

There are various scenarios in which the UE transmission direction (e.g., ether UL transmission or DL reception) is performed for a given slot when there is a conflict for the slot. Each of the scenarios can be handled by the UE in a particular way or a combination of ways, as now described. In a first scenario, the UE has a PDCCH monitoring occasion that is fixed by the RRC signaling. The PDCCH monitoring occasion can conflict with a PUSCH/PUCCH/SRS/PRACH transmission in a slot operating in the XDD mode.

In a first option, if there is a scheduled UL transmission or a PRACH transmission is scheduled for the slot, the UE is configured to ignore the PDCCH monitoring occasion. In this option, the UE designates the slot as a UL slot. If there is no scheduled UL transmission or PRACH transmission, the UE monitors the PDCCH in the slot and designates the slot as a DL slot.

In a second option, if the UE has a CG PUSCG/SRS transmission, the PDCCH monitoring occasion has the higher priority as defined by the base station. The UE designates the slot as a DL slot.

In a third option, a priority for the PDCCH monitoring occasion is defined based on a type of the search space. In this example, a UE-specific search space (USS) has a higher priority than the UL transmission. The USS is a search space that is specific to the UE and monitored by the UE in a connected mode. The UE performs scheduling of DL and UL data transmissions during USS. The common search space (CSS) has a lower priority than the UL transmission. CSS can include search space monitored by the UE for paging occasions in idle mod (e.g., type-1 CSS). In another example, CSS can include a search space monitored by the UE during a random access procedure in idle and connected mode (e.g., a type-2 CSS). In another example, the CSS can include a search space monitored by the UE when the UE is configured with CE mode A in a connected mode, and can be used for power control commands or as a fallback if the USS fails.

In a fourth option, the UE is configured to determine the transmission direction rather than assume a particular transmission direction.

In a second scenario, the UE has a conflict between SSB operation and a PUSCH/PUCCH/SRS/PRACH transmission. In a first option, the UL transmission has priority over the SSB operation, and the UE designate the slot for UL. In a second option, the UE determines the transmission direction rather than assuming UL transmission for the slot.

In a third scenario, the UE has a conflict between DG PDSCH and CG/DG PUSCH, PUCCH, SRS, or PRACH transmissions. When the collision is specifically between DG PDSCH and DG PUSCH, the UE performs one of the following options. In a first option, the UE determines priority according to a PUSCH processing timeline. For example, if a condition in which time period between a last symbol of DCI for PDSCH to the overlapped symbol of PUSCH is larger than the processing time $T_{proc,2}$ is satisfied, then the PUSCH transmission is dropped and the UE designates the slot as a DL slot. If this condition is not satisfied, the PDSCH is dropped and the UE designates the slot as an UL slot. In another example, the base station defines the priority rule for the transmission direction. The base station defines the priority rule by assigning a lower priority to DG PDSCH relative to a higher priority for the DG PUSCH transmission. In other words, if PDSCH and PUSCH otherwise have a same priority level, the PUSCH is prioritized over the PDSCH. The priority is defined by the base station using a priority bit that is analyzed by the UE. In another example, the UE does not define the priority in advance. The UE relies on base station schedule (e.g., gNB scheduling) to determine whether the slot is designated for UL or for DL. If there is a collusion from a scheduling error, the UE is configured to determine which data to drop: the DL reception or the UL transmission.

Collision handling by the UE between DG PDSCH and CG/DG PUSCH, PUCCH, SRS, or PRACH is now described. The UE is configured to handle collisions between DG PDSCH and CG PUSCH as follows. In a first option, the UE drops the CG PUSCH if there is a collision in the slot, and UE doesn't expect the gap is smaller than the time period of $T_{proc,\,2}$, where the gap is the last symbol of DCI for PDSCH to the symbol for CG PUSCH overlapped with PDSCH. In another option the UE does not expect a collision between DG PDSCH reception and DG PUSCH transmission. The UE is configured to determine what channel to drop. The UE drops part of PUSCH (e.g., where overlapping with PDSCH) when the time is larger than UE processing time from DCI to overlapped symbols.

In a scenario, the UE experiences a collision between DG PDSCH and PUCCH transmissions. In a first option, the UE drops the DG PDSCH. In a second option, the UE does not expect the collision and can determine what to drop of the DG PDSCH reception and PUCCH transmission.

In another scenario, the UE experiences a collision between the DG PDSCH and the SRS. For a collision between a DG PDSCH and a periodic SRS, the UE drops the period SRS. For an aperiodic SRS collision with the DG PDSCH, the collision is unexpected. The UE is to determine whether to drop the aperiodic SRS or the DG PDSCH. The UE implementation may enable the UE to drop either the aperiodic SRS or the DG PDSCH.

In a scenario, there is a collision between scheduled DG PDSCH and PRACH for the UE. In a first option, the UE follows a priority rule that is received from the base station. For example, a high priority bit can be assigned to the PRACH, and therefore the UE drops the DG PDSCH. In another option, the UE determines which channel or signal is dropped.

When the UE experiences a collision between CG PDSCH and CG/DG PUSCH, PUCCH, SRS or PRACH channels or signals, the collision is resolved according to the following description. In a first scenario, there is a CG PDSCH collision with DG PUSCH. In a first option, the UE drops the CG PDSCH. In a second option, the base station defines a priority rule, such as that a lower priority DG PUSCH is dropped. The base station assigns a value to a priority bit during scheduling to indicate the priority value. In another option, the UE is to determine which channel or signal is dropped based on the particular UE implementation or configuration.

In a scenario, there is a CG PDSCH collision with CG PUSCH. To handle the collision, in a first option, the base station defines a priority rule. For example, a low priority CG PUSCH is dropped by the UE. The base station assigns a value to a priority bit during scheduling to indicate the priority value. In a second option, the UE is able to determine which channel or signal to drop.

In a scenario, there is a CG PDSCH collision with PUCCH. To resolve the collision, in a first option, the UE drops the CG PUSCH. In a second option, UE does not expect a collision between CG PDSCH reception and PUCCH transmission. The UE is able to determine which channel or signal to drop.

In a scenario, there is a CG PDSCH collision with SRS signaling. In this scenario, the UE doesn't expect the collision between a CG PUSCH and an aperiodic SRS. In this case, the UE is able to determine which channel or signal to drop. When the SRS is periodic or semi-periodic, the UE drops the SRS.

In a scenario, there is a CG PDSCH collision with PRACH. In this scenario, the UE drops the CG PDSCH.

Figure 6:
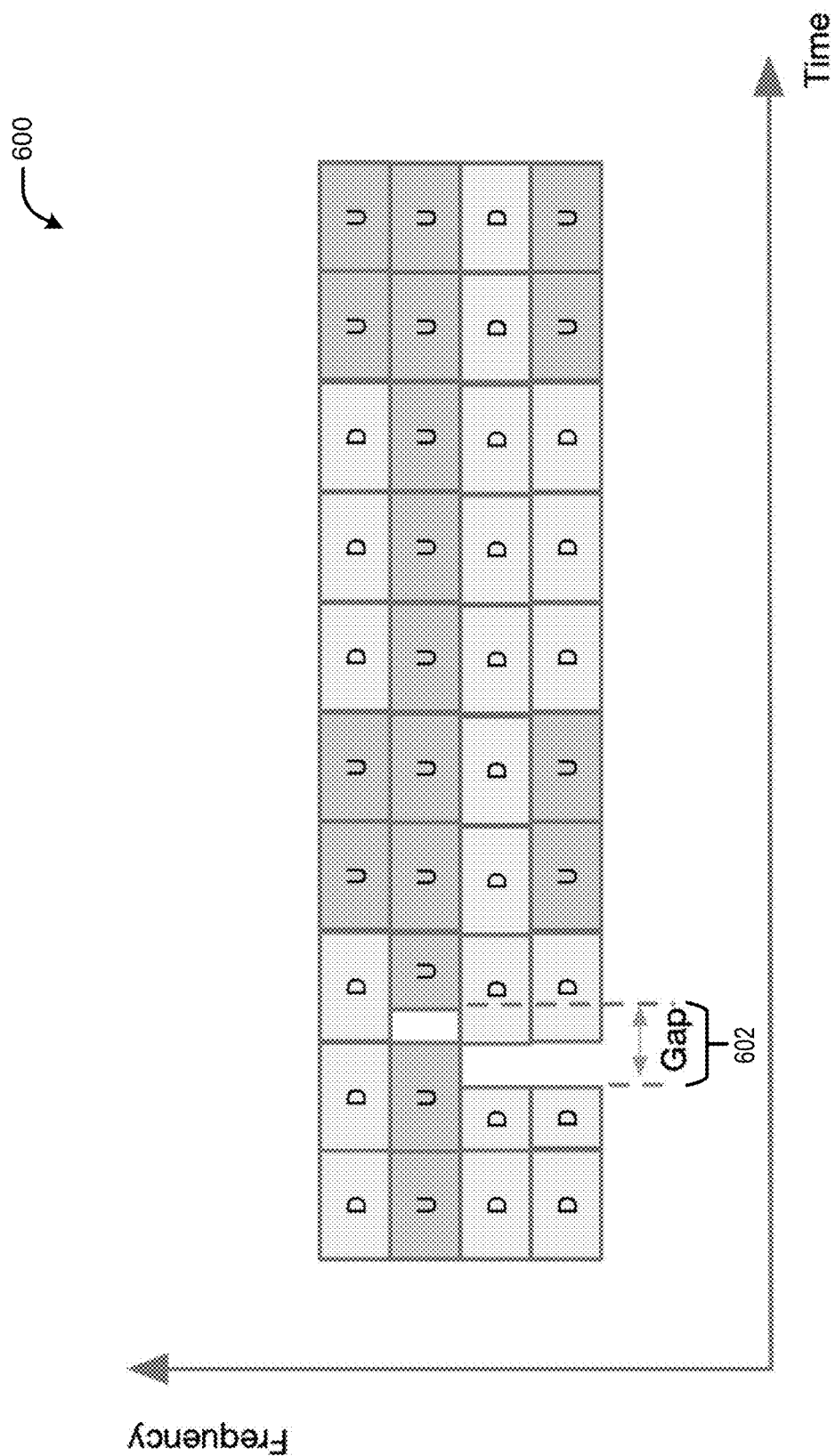
FIG. 6 shows a frame structure in which a switching gap is present.

FIG. 6 shows a frame structure 600 in which a switching gap 602 is present. For XDD operation, the UE can have DL to UL switching between any two consecutive slots. In some implementations, the UE has DL to UL switching within one slot. The switching gap 602 enables UE switching from DL reception to UL transmission. The gap 602 allows signal propagation from the base station to arrive at the UE before the UE shuts off the receiver to prepare for transmission of data back to the base station. The location and length in time of the switching gap 602 can be configured by the base station (such as during UL scheduling) and communicated to the UE. In some implementations, the UE determines the configuration of the switching gap 602.

In a first scenario, the switching gap 602 is configured by the base station for a given length (e.g., two symbols) and this definition is sent to the UE. The UE does not expect DL signal/channel reception (e.g., PDSCH) or UL signal/channel transmission (PUSCH) during the gap 602. If the gap is smaller than the configured value, the UE drops the PDSCH reception or PUSCH transmission.

In a second scenario, the UL and DL scheduling are configured such that the UE assumes that there is no DL reception overlapping with UL transmission. To achieve this, the scheduled transmission or reception (e.g., PDSCH or PUSCH) are scheduled with empty symbols in the slot to guarantee that there is room for a switching cap 602 as needed. For example, if the PUSCH requires 6 symbols, the UE reserves 10 symbols for the PUSCH. Similarly, if the PDSCH requires 6 symbols, the UE reserves 10 symbols. There are then 8 symbols available for the switching gap 602. If an unexpected collision occurs, the UE can use the empty symbols to resolve the collision. The UE does not need to schedule the gap 602 in advance.

In a third scenario, the gap 602 is small (e.g., fewer than 5 symbols). The gap 602 is determined by the UL or DL scheduling process (e.g., by the base station). If the switching gap 602 is less than a threshold value, the UE drops either the DL reception or the UL transmission based on a predefined priority hierarchy.

Figure 7:
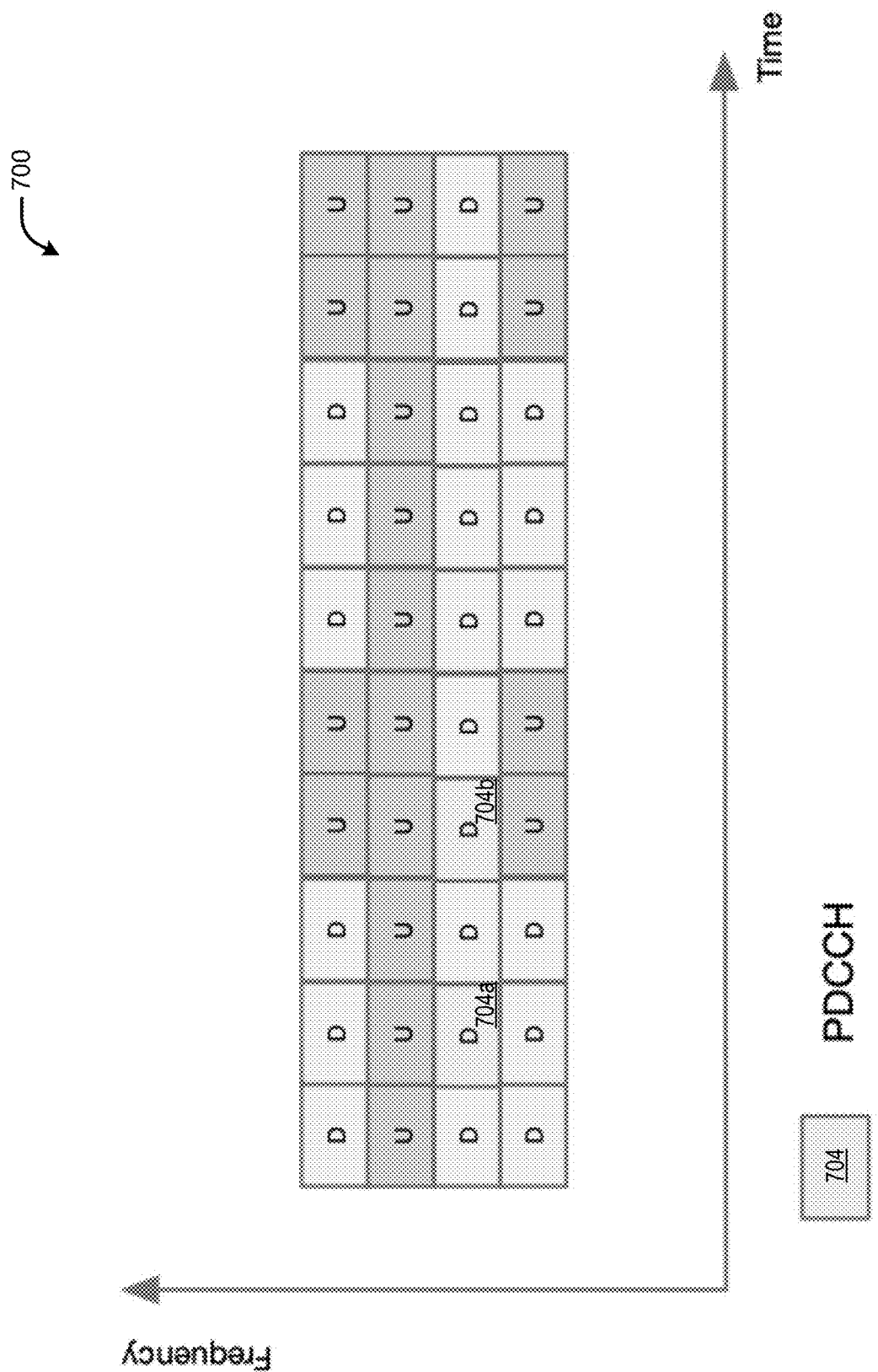
FIG. 7 shows an example frame structure in which PDCCH COREST is configured a DL slot.

The predefined priority hierarchy for dropping either UL transmission or DL reception by the UE is now described for several examples of the third scenario. In a first example, there is a PDCCH monitoring occasion 704 collision with DG or CG PUSCH, PUCCH, or PRACH. In this example, if a PDCCH COREST is configured a DL slot (e.g., using DL PRBs), as shown by PRBs 704a-b of frame structure 700 of FIG. 7. For a PDCCH monitoring occasion colliding with CG PUSCH (including repetitions), the PUSCH is dropped. For a PDCCH monitoring occasion colliding with DG PUSCH (including repetitions), a priority rule is defined by the base station during UL or DL scheduling. For example, the PDCCH monitoring occasion is prioritized over DG PUSCH. In another example, the priority rule indicates that a high priority DG PUSCH is prioritized over PDCCH monitoring. The base station can indicate high or low priority in a priority bit during scheduling (e.g., in the DCI), as previously described. In another example, for PDCCH colliding with PUCCH, PUCCH has priority. In this example, the UE is configured to ignore the PDCCH monitoring occasion and instead transmit the PUCCH. In another example, when PDCCH collides with a UE-specific PRACH, a priority rule is pre-defined by the base station during scheduling, as previously described.

Figure 8:
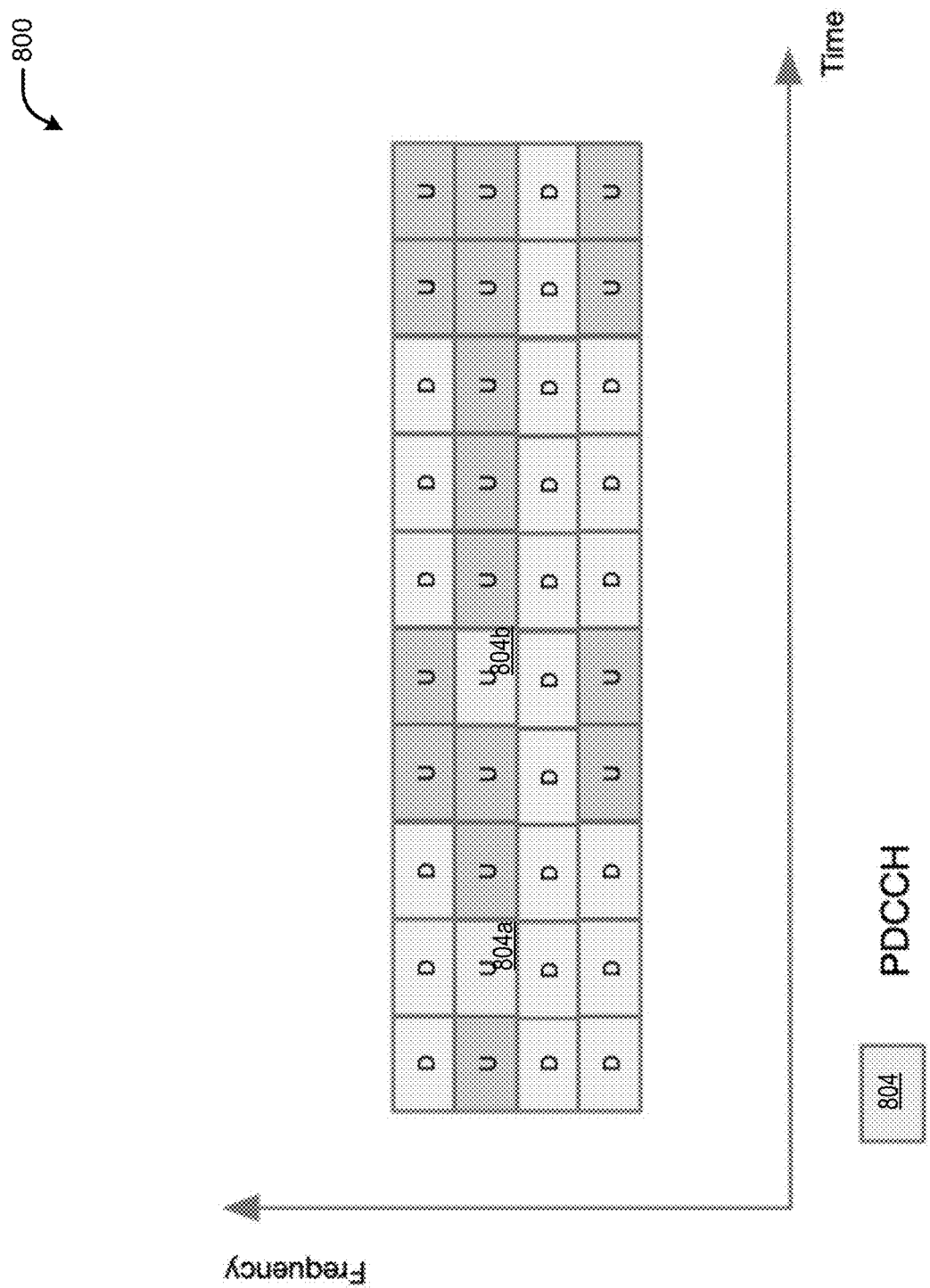
FIG. 8 shows an example frame structure in which PDCCH COREST is configured an UL slot.

In another scenario, the PDCCH COREST is configured in the UL PRBs 804a-b of a DL slot or in a UL slot, as shown in frame structure 800 FIG. 8. The PDCCH CORSET is configured during dynamic scheduling (RRC messaging). In a first option, the UE is configured to assume that such a configuration is invalid. Alternatively or in addition, the PDCCH monitor occasion of PRBs 804a-b is ignored. In a second option, the PDCCH CORESET indicates that the UE should revert the transmission direction that is configured for the XDD PRBs, such that the XDD PRBs (e.g., PRBs 804a-b) are scheduled as DL PRBs. Because these PRBs are scheduled in a semi-static way, the UE can revert these PRBs to DL PRBs and proceed as if the switch in transmission direction from XDD was not scheduled. The UE the proceeds as described in relation to FIG. 7, in which the PRBs 704*a-b* are DL PRBs.

In another scenario, the UE experiences a collision between SSB reception and an UL transmission, such as CG or DG PUSCH, PRACH, or PUCCH. When the PRBs 804*a-b* are configured for SSB transmission, then PRBs 804*a-b* are DL PRBs in the slots with SSB transmission. Because these PRBs are scheduled for SSB reception, they cannot be changed for UL transmission. This is because SSB has a higher priority than the UL channel, and so the UL transmission is dropped if there is a collision with SSB signaling. To resolve the collision, the UE reverts the PRBs changed for XDD operation and configures PRBs 804*a-b* for DL reception.

In another scenario, the CG PDSCH collides with the CG PUSCH or DG PUSCH, PUCCH, or PRACH. When the CG PDSCH collides with the CG PUSCH, the priority rule is predefined by the base station. For example, CG PDSCH has a higher priority than CG PUSCH. In another example, the CG PDSCH collides with the DG PUSCH, PUCCH, or PRACH. In this example, the CG PDSCH is dropped for reception. The priority rule is sent to the UE before the CG transmission. The priority can be indicated by RRC signaling, or DCI (e.g., only for type-II CG PUSCH).

Figure 9:
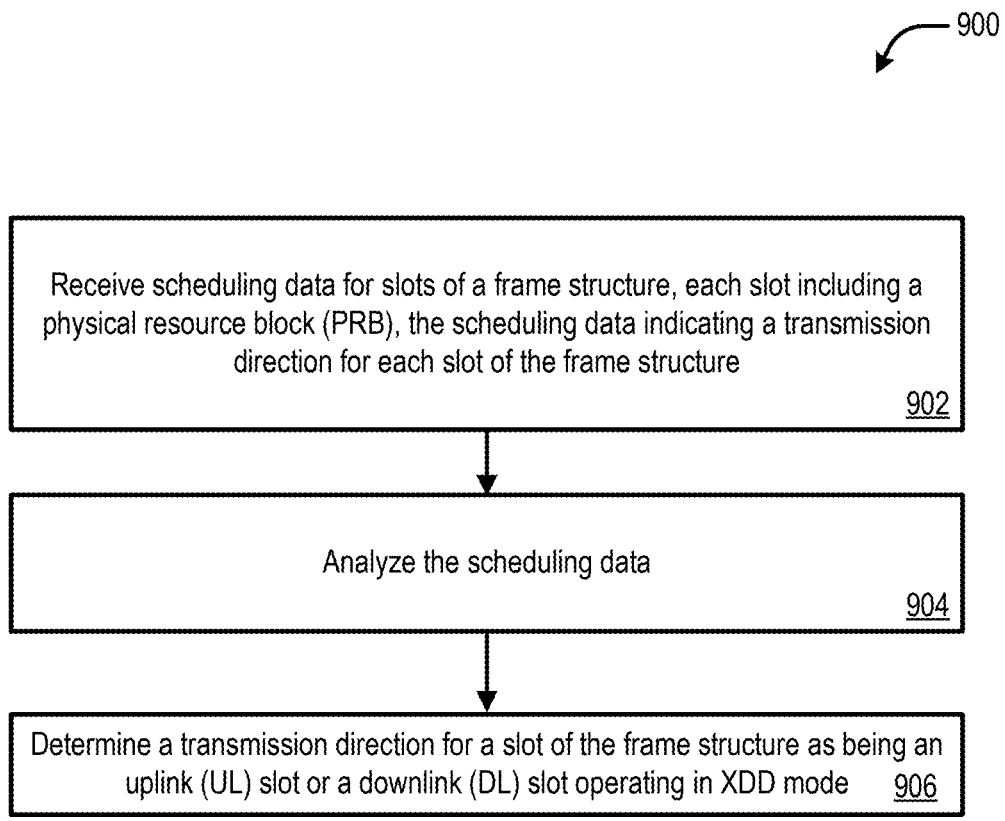
FIG. 9 shows an example of a process for configuring XDD operation of a UE.

FIG. 9 illustrates an example process for interleaved control channel element to resource element group mapping in accordance with some implementations of the present disclosure.

In another scenario, the DG PDSCH collides with the CG PUSCH or DG PUSCH, PUCCH, or PRACH. In a first option, when the DG PDSCH collides with the DG PUSCH, a priority rule is predefined. For example, a when a high priority PUSCH (as designated by the base station in the DCI signaling) collides with a low priority PDSCH transmission (as designated in the DCI scheduling), the UE drops the low priority PDSCH. In another option, the DCI assigns a first scheduled transmission or reception a high priority relative to later scheduled transmissions or receptions. The UE drops later scheduled transmissions or receptions that have lower priority. In another example, the UE receives an unexpected collision between the DG PDSCH and the DG PUSCH. In this case, the UE is to decide which of the DG PDSCH or the DG PUSCH to drop. Generally, if the DG PDSCH and DG PUSCH have different priorities, the lower priority one is dropped by the UE. If both channels have the same priority, the described priority rules are defined and sent to the UE before the actual transmission (e.g., by DCI scheduling). For example, as previously described, the priority rule may indicate that the PUSCH is transmitted and the PDSCH is dropped.

In another option, the DG PDSCH collides with the CG PUSCH. In this option, when a gap between a last symbol of the CORESET for DL DCI and a first symbol of the CG PUSCH is larger than the time for $T_{Proc,2}$, the UE drops the PUSCH. If this criterion is not satisfied, the UE drops the PDSCH for reception.

In another option, the DG PDSCH collides with the PUCCH. In a first example, the UE drops the DG PDSCH. In another example, a priority rule is predefined by the base station using DCI. For example, a high priority PDSCH (as indicated by the base station during scheduling) is prioritized by the UE over a lower priority PUCCH that is dropped. In another example, the UE prioritizes PUCCH over a low priority PDSCH (as indicated in the scheduling signaling from the base station). In this case, the UE drops the PDSCH.

In another option, the DG PDSCH collides with PRACH. In an example, a priority rule is predefined. The UE drops the PRACH and keeps the higher priority PDSCH. In another example, UE drops a lower priority PDSCH and keeps the PRACH. As previously described, the priority value for the PDSCH is defined by the base station during scheduling.

FIG. 9 shows an example of a process 900 for configuring XDD operation of a UE. In some implementations, the UEs can include the UEs 101*a-b* of FIGS. 1-2. In some implementations, the base station includes the nodes 111*a-b* or network 120 as described in relation to FIGS. 1-8. The process 900 can be performed by the UE. The process 900 includes receiving (902), from the base station, scheduling data for slots of a frame structure, each slot including a physical resource block (PRB), wherein each slot of the frame structure occupies a frequency bandwidth and an associated time in the frame structure, the scheduling data indicating a transmission direction for each slot of the frame structure. As described herein, the scheduling data includes the priority data indicating which transmission direction has priority for a given scenario. In some implementations, the base station provides an indication of a transmission direction for the PRBs using Radio Resource Control (RRC) signaling. In some implementations, the RCC signaling indicates one or more of: a number of PRBs for DL reception from respective UL slots, and PRB offset values from a start PRB for each PRB for DL reception from a UL slot. In some implementations, the RCC signaling indicates one or more guard PRBs between DL and UL slots. In some implementations, the RCC signaling includes a bitmap indicating slots eligible for XDD operation. In some implementations, the base station provides an indication of a transmission direction for the one or more PRBs using UL or DL scheduling, and wherein the UL or DL scheduling indicates one or more of a number of PRBs for DL reception from respective UL slots and PRB offset values from a start PRB for each PRB for DL reception from a UL slot.

The process 900 includes analyzing (904) the scheduling data by the UE. The UE is configured to schedule UL and DL transmission directions for each of the slots based on the received scheduling data. The UE is configured to determine (906), based on the analyzing, determining a transmission direction for a slot of the frame structure as being an uplink (UL) slot or a downlink (DL) slot operating in XDD mode, as described herein.

Figure 10:
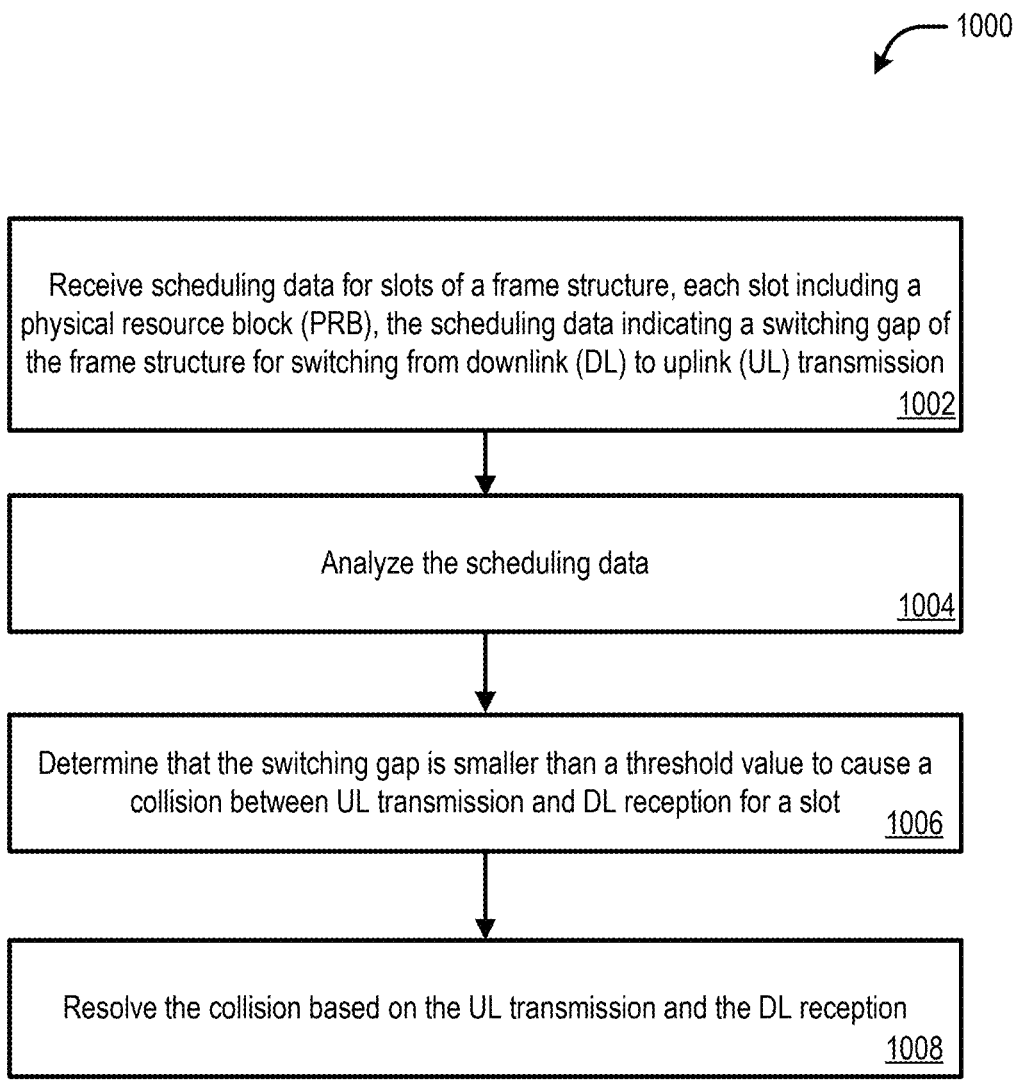
FIG. 10 shows an example of a process for configuring XDD operation of a UE.

FIG. 10 shows an example of a process for configuring XDD operation of a UE. In some implementations, the UEs can include the UEs 101*a-b* of FIGS. 1-3. In some implementations, the base station includes the nodes 111*a-b* or network 120 as described in relation to FIGS. 1-8. The process 1000 can be performed by a UE. The process 1000 comprises receiving (1002), from a base station, data indicating a scheduling data for slots of a frame structure, each slot including a physical resource block (PRB), wherein each slot of the frame structure occupies a frequency bandwidth and an associated time in the frame structure, the scheduling data indicating a switching gap of the frame structure for switching from downlink (DL) to uplink (UL) transmission.

In some implementations, the base station provides an indication of a transmission direction for the PRBs using Radio Resource Control (RRC) signaling. In some implementations, the RCC signaling indicates one or more of: a number of PRBs for DL reception from respective UL slots, and PRB offset values from a start PRB for each PRB for DL reception from a UL slot. In some implementations, the RCC signaling indicates one or more guard PRBs between DL and UL slots. In some implementations, the RCC signaling includes a bitmap indicating slots eligible for XDD operation. In some implementations, the base station provides an indication of a transmission direction for the one or more PRBs using UL or DL scheduling, and wherein the UL or DL scheduling indicates one or more of a number of PRBs for DL reception from respective UL slots and PRB offset values from a start PRB for each PRB for DL reception from a UL slot.

The process 1000 includes analyzing (1004) the scheduling data by the UE. The UE is configured to schedule UL and DL transmission directions for each of the slots based on the received scheduling data. The UE is configured to determine (1006), based on the analyzing, that the switching gap is smaller than a threshold value to cause a collision between UL transmission and DL reception for a slot. The UE is configured to resolve (1008) the collision based on the UL transmission and the DL reception signals or channels, as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Examples

In the following sections, further exemplary embodiments are provided.

Example 1 includes a user equipment (UE) for cross division duplex (XDD) operations, the UE comprising: circuitry for transmitting and receiving data from a base station; and one or more processing devices configured to perform operations comprising: receiving, from the base station, data indicating a scheduling data for slots of a frame structure, each slot including a physical resource block (PRB), wherein each slot of the frame structure occupies a frequency bandwidth and an associated time in the frame structure, the scheduling data indicating a transmission direction for each slot of the frame structure; analyzing the scheduling data; and based on the analyzing, determining a transmission direction for a slot of the frame structure as being an uplink (UL) slot or a downlink (DL) slot operating in XDD mode.

Example 2 includes a UE of example 1 or some other example herein, wherein determining the transmission direction for a slot of the frame structure comprises resolving a conflict between scheduled UL transmission and DL reception for the slot.

Example 3 includes a UE of examples 1-2 or some other example herein, wherein resolving the conflict comprises: determining that a scheduled physical downlink control channel (PDCCH) monitoring occasion conflicts with at least one of a physical uplink shared channel (PUSCH), a physical uplink control channel (PUCCH), a sounding reference signal (SRS), or a physical random access channel (PRACH) transmission in the slot operating in XDD mode; and assigning the transmission direction to the slot based on the conflict.

Example 4 includes a UE of example 3 or some other example herein, the operations further comprising: determining that a scheduled UL transmission or PRACH transmission conflicts with the PDCCH monitor occasion; and ignoring the PDCCH monitor occasion.

Example 5 includes a UE of example 3 or some other example herein, the operations further comprising: determining that a CG PUSCH or SRS transmission is a lower priority than the PDCCH monitor occasion; and assigning a DL transmission direction to the slot.

Example 6 includes a UE of example 3 or some other example herein, the operations further comprising: determining that a search space type is one of a UE-based search space (USS) or a common search space (CSS); in response to determining the search space type is USS, assigning an UL transmission direction to the slot; and in response to determining that the search space type is CSS, assigning a DL transmission direction to the slot.

Example 7 includes a UE of examples 1-6 or some other example herein, wherein resolving the conflict comprises: determining that a synchronization signal block (SSB) conflicts with at least one of a PUSCH, a PUCCH, an SRS, or a PRACH transmission in the slot operating in XDD mode; and assigning the transmission direction to the slot based on the conflict.

Example 8 includes a UE of example 7 or some other example herein, the operations further comprising: determining that an UL transmission has priority; and assigning an UL transmission direction to the slot.

Example 9 includes a UE of example 7 or some other example herein, wherein resolving the conflict comprises: determining that a DL grant (DG) PDSCH conflicts with a DG PUSCH; and assigning the transmission direction to the slot based on the conflict.

Example 10 includes a UE of examples 1-7 or some other example herein, the operations further comprising: determining that a time between a last symbol of downlink control information (DCI) for PDSCH to an overlapped symbol of PUSCH is larger than a preparation delay $T_{proc,2}$; and dropping the PUSCH and assigning a DL transmission direction to the slot.

Example 11 includes a UE of example 10 or some other example herein 11. The method of claim 9, the operations further comprising: determining that DG PDSCH has a lower priority than DG PUSCH; and assigning an UL transmission direction to the slot.

Example 12 includes a UE of example 10 or some other example herein, wherein resolving the conflict comprises: determining that a DG PDSCH conflicts with a configured UL grant (CG) PUSCH; and assigning the transmission direction to the slot based on the conflict.

Example 13 includes a UE of example 12 or some other example herein, the operations further comprising: dropping the CG PUSCH; and assigning a DL transmission direction to the slot.

Example 14 includes a UE of examples 1-13 or some other example herein, the operations further comprising: determining that a DG PDSCH conflicts with PUCCH; and assigning the transmission direction to the slot based on the conflict.

Example 15 includes a UE of example 14 or some other example herein, the operations further comprising: dropping the DG PUSCH; and assigning an UL transmission direction to the slot.

Example 16 includes a UE of examples 1-15 or some other example herein, the operations further comprising: determining that DG PDSCH conflicts with SRS; and assigning the transmission direction to the slot based on the conflict.

Example 17 includes a UE of example 16 or some other example herein, the operations further comprising: determining that the SRS is periodic; in response to determining that the SRS is periodic, dropping the SRS; and assigning a DL transmission direction to the slot.

Example 18 includes a UE of examples 1-17 or some other example herein, the operations further comprising: determining that DG PDSCH conflicts with PRACH transmission; and assigning the transmission direction to the slot based on the conflict.

Example 19 includes a UE of example 18 or some other example herein, the operations further comprising: dropping the DG PDSCH; and assigning an UL transmission direction to the slot.

Example 20 includes a UE of examples 1-19 or some other example herein, the operations further comprising: determining that CG PDSCH conflicts with DG PUSCH; and assigning the transmission direction to the slot based on the conflict.

Example 21 includes a UE of example 120 or some other example herein, the operations further comprising: dropping the CG PDSCH; and assigning a DL transmission direction to the slot.

Example 22 includes a UE of example 20 or some other example herein, the operations further comprising: determining that a first priority value of the DG PUSCH is lower than a second priority value of the CG PDSCH; dropping the DG PUSCH; and assigning an UL transmission direction to the slot.

Example 23 includes a UE of examples 1-22 or some other example herein, the operations further comprising: determining that CG PDSCH conflicts with CG PUSCH; and assigning the transmission direction to the slot based on the conflict.

Example 24 includes a UE of example 23 or some other example herein, the operations further comprising: determining that a first priority value of the CG PUSCH is lower than a second priority value of the CG PDSCH; and assigning an UL transmission direction to the slot.

Example 25 includes a UE of examples 1-23 or some other example herein, the operations further comprising: determining that CG PDSCH conflicts with PUCCH; and assigning the transmission direction to the slot based on the conflict.

Example 26 includes a UE of example 25 or some other example herein, the operations further comprising: dropping the CG PUSCH; and assigning a DL transmission direction to the slot.

Example 27 includes a UE of examples 1-26 or some other example herein, the operations further comprising: determining that CG PDSCH conflicts with SRS; and assigning the transmission direction to the slot based on the conflict.

Example 28 includes a UE of example 27 or some other example herein, the operations further comprising: determining that the SRS is periodic; in response to the determining, dropping the SRS; and assigning a DL transmission direction to the slot.

Example 29 includes a UE of examples 1-28 or some other example herein, the operations further comprising: determining that CG PDSCH conflicts with PRACH; and assigning the transmission direction to the slot based on the conflict.

Example 30 includes a UE of example 29 or some other example herein, the operations further comprising: dropping the CG PDSCH; and assigning a DL transmission direction to the slot.

Example 31 includes a UE of examples 1-30 or some other example herein, wherein the base station provides an indication of a transmission direction for the PRBs using Radio Resource Control (RRC) signaling.

Example 32 includes a UE of examples 1-31 or some other example herein, wherein the RCC signaling indicates one or more of: a number of PRBs for DL reception from respective UL slots, and PRB offset values from a start PRB for each PRB for DL reception from a UL slot.

Example 33 includes a UE of example 32 or some other example herein, wherein the RCC signaling indicates one or more guard PRBs between DL and UL slots.

Example 34 includes a UE of example 33 or some other example herein, wherein the RCC signaling includes a bitmap indicating slots eligible for XDD operation.

Example 35 includes a UE of examples 1-34 or some other example herein, wherein the base station provides an indication of a transmission direction for the one or more PRBs using UL or DL scheduling, and wherein the UL or DL scheduling indicates one or more of a number of PRBs for DL reception from respective UL slots and PRB offset values from a start PRB for each PRB for DL reception from a UL slot.

Example 36 includes a UE for cross division duplex (XDD) operations, the UE comprising: circuitry for transmitting and receiving data from a base station; and one or more processing devices configured to perform operations comprising: receiving, from a base station, data indicating a scheduling data for slots of a frame structure, each slot including a physical resource block (PRB), wherein each slot of the frame structure occupies a frequency bandwidth and an associated time in the frame structure, the scheduling data indicating switching gap of the frame structure for switching from downlink (DL) to uplink (UL) transmission; analyzing the scheduling data; and based on the analyzing, determining that the switching gap is smaller than a threshold value to cause a collision between UL transmission and DL reception for a slot; and based on the determining, resolving the collision based on the UL transmission and the DL reception.

Example 37 includes a UE of example 36 or some other example herein, wherein a PDCCH COREST is configured in one or more DL PRBs of a DL slot or of a UL slot.

Example 38 includes a UE of example 37 or some other example herein, wherein a PDCCH conflicts with a CG PUSCH, the operations further comprising dropping the PUSCH.

Example 39 includes a UE of examples 36-38 or some other example herein, wherein a PDCCH conflicts with a DG PUSCH, the operations further comprising: determining a priority of the DG PUSCH; dropping the PDCCH if the DG PUSCH has a high priority bit; and dropping the DG PUSCH if the DG PUSCH has a low priority bit.

Example 40 includes a UE of examples 36-39 or some other example herein, wherein a PDCCH conflicts with PUCCH, the operations further comprising dropping the PDCCH.

Example 41 includes a UE of examples 36-40 or some other example herein, wherein a PDCCH conflicts with a PRACH, the operations further comprising: determining a priority associated with the PRACH; and dropping the PRACH or the PDCCH based on the priority.

Example 42 includes a UE of examples 36-41 or some other example herein, wherein a PDCCH monitoring occasion is configured in the UL PRBs of DL slot or of a UL slot.

Example 43 includes a UE of example 42 or some other example herein, the operations further comprising dropping the PDCCH monitoring occasion.

Example 44 includes a UE of example 42 or some other example herein, the operations further comprising reverting an XDD configured PRB transmission direction from the UL direction to the DL direction.

Example 45 includes a UE of examples 36-44 or some other example herein, wherein DG PDSCH collides with DG PUSCH, the operations further comprising: resolving the collision based on a priority rule.

Example 46 includes a UE of example 45 or some other example herein, wherein the DG PUSCH has high priority, and wherein the PDSCH transmission is dropped to resolve the collision.

Example 47 includes a UE of example 46 or some other example herein, wherein the priority rule specifies that a first scheduled transmission or reception has a high priority.

Example 48 includes a UE of examples 36-47 or some other example herein, wherein DG PDSCH collides with CG PUSCH, the operations further comprising: resolving the collision based on a priority rule.

Example 49 includes a UE of example 48 or some other example herein, wherein the priority rule specifies that when a gap of a last symbol of a CORESET for DL DCI to a first symbol of the CG PUSCH is longer than a processing time $T_{Proc,2}$, the PUSCH id dropped.

Example 50 includes a UE of example 36-49 or some other example herein, wherein DG PDSCH collides with PUCCH, the operations further comprising: resolving the collision based on a priority rule.

Example 51 includes a UE of example 50 or some other example herein, wherein the priority rule specifies that DG PDSCH is dropped.

Example 52 includes a UE of example 50 or some other example herein, wherein the priority rule specifies that a low priority PDSCH is dropped when colliding with the PUSCCH and that the PUSCCH is dropped when the PUSCCH collides with a high priority PDSCH.

Example 53 may include a signal as described in or related to any of examples 1-52, or portions or parts thereof.

Example 54 may include a datagram, information element, packet, frame, segment, PDU, or message as described in or related to any of examples 1-52, or portions or parts thereof, or otherwise described in the present disclosure.

Example 55 may include a signal encoded with data as described in or related to any of examples 1-52, or portions or parts thereof, or otherwise described in the present disclosure.

Example 56 may include a signal encoded with a datagram, IE, packet, frame, segment, PDU, or message as described in or related to any of examples 1-52, or portions or parts thereof, or otherwise described in the present disclosure.

Example 57 may include an electromagnetic signal carrying computer-readable instructions, wherein execution of the computer-readable instructions by one or more processors is to cause the one or more processors to perform the method, techniques, or process as described in or related to any of examples 1-56, or portions thereof.

Example 58 may include a computer program comprising instructions, wherein execution of the program by a processing element is to cause the processing element to carry out the method, techniques, or process as described in or related to any of examples 1-52, or portions thereof.

Example 59 may include a signal in a wireless network as shown and described herein.

Example 60 may include a method of communicating in a wireless network as shown and described herein.

Example 61 may include a system for providing wireless communication as shown and described herein.

Example 62 may include a device for providing wireless communication as shown and described herein.

What is claimed is:

1. An apparatus comprising:
a memory storing instructions; and
one or more processing devices configured to execute the instructions to perform operations comprising:
receiving, from a remote device, scheduling information for slots of a frame structure, each slot including a physical resource block (PRB), wherein each slot of the frame structure occupies a frequency bandwidth and an associated time in the frame structure, the scheduling information indicating a transmission direction for each slot of the frame structure, a number of PRBs for downlink (DL) reception that are changed from respective uplink slots, and PRB offset value from a start PRB for each of the PRBs for downlink reception; and
based on the scheduling information, determining a transmission direction for a slot of the frame structure as being an UL slot or a DL slot operating in cross division duplex (XDD) mode.

2. The apparatus of claim 1, wherein determining the transmission direction for a slot of the frame structure comprises resolving a conflict between scheduled UL transmission and DL reception for the slot.

3. The apparatus of claim 2, wherein resolving the conflict comprises:
determining that a scheduled physical downlink control channel (PDCCH) monitoring occasion conflicts with at least one of a physical uplink shared channel (PUSCH), a physical uplink control channel (PUCCH), a sounding reference signal (SRS), or a physical random access channel (PRACH) transmission in the slot operating in XDD mode; and
assigning the transmission direction to the slot based on the conflict.

4. The apparatus of claim 3, the operations further comprising:
determining that a scheduled UL transmission or PRACH transmission conflicts with the PDCCH monitor occasion; and
ignoring the PDCCH monitor occasion.

5. The apparatus of claim 3, the operations further comprising:
determining that a configured grant (CG) PUSCH or SRS transmission is a lower priority than the PDCCH monitor occasion; and
assigning a DL transmission direction to the slot.

6. The apparatus of claim 3, the operations further comprising:
determining that a search space type is one of a UE-based search space (USS) or a common search space (CSS);
in response to determining the search space type is USS, assigning an UL transmission direction to the slot; and
in response to determining that the search space type is CSS, assigning a DL transmission direction to the slot.

7. The apparatus of claim 2, wherein resolving the conflict comprises:
determining that a synchronization signal block (SSB) conflicts with at least one of a PUSCH, a PUCCH, an SRS, or a PRACH transmission in the slot operating in XDD mode; and
assigning the transmission direction to the slot based on the conflict,
determining that an UL transmission has priority; and
assigning an UL transmission direction to the slot.

8. The apparatus of claim 2, wherein resolving the conflict comprises:
determining that a DL grant (DG) PDSCH conflicts with a DG PUSCH; and assigning the transmission direction to the slot based on the conflict;

determining that a time between a last symbol of downlink control information (DCI) for PDSCH to an overlapped symbol of PUSCH is larger than a preparation delay Tproc, 2, and dropping the PUSCH and assigning a DL transmission direction to the slot; or determining that DG PDSCH has a lower priority than DG PUSCH, and assigning an UL transmission direction to the slot.

9. The apparatus of claim 2, wherein resolving the conflict comprises:

determining that a DG PDSCH conflicts with a configured UL grant (CG) PUSCH; and assigning the transmission direction to the slot based on the conflict;

dropping the CG PUSCH; and assigning a DL transmission direction to the slot.

10. The apparatus of claim 2, the operations further comprising:

determining that a DG PDSCH conflicts with PUCCH; and assigning the transmission direction to the slot based on the conflict;

dropping the DG PDSCH; and assigning an UL transmission direction to the slot.

11. The apparatus of claim 2, the operations further comprising:

determining that DG PDSCH conflicts with SRS;

assigning the transmission direction to the slot based on the conflict determining that the SRS is periodic;

in response to determining that the SRS is periodic, dropping the SRS; and assigning a DL transmission direction to the slot.

12. The apparatus of claim 2, the operations further comprising:

determining that DG PDSCH conflicts with PRACH transmission;

assigning the transmission direction to the slot based on the conflict;

dropping the DG PDSCH; and assigning an UL transmission direction to the slot.

13. The apparatus of claim 2, the operations further comprising:

determining that CG PDSCH conflicts with DG PUSCH;

assigning the transmission direction to the slot based on the conflict; and dropping the CG PDSCH, and assigning a DL transmission direction to the slot; or determining that a first priority value of the DG PUSCH is lower than a second priority value of the CG PDSCH, dropping the DG PUSCH, and assigning an UL transmission direction to the slot.

14. The apparatus of claim 1, wherein the remote device provides an indication of a transmission direction for the PRBs using Radio Resource Control (RRC) signaling, and wherein the RRC signaling indicates one or more of: a number of PRBs for DL reception from respective UL slots, and PRB offset values from a start PRB for each PRB for DL reception from a UL slot.

15. The apparatus of claim 1, wherein the remote device provides an indication of a transmission direction for one or more PRBs using UL or DL scheduling, and wherein the UL or DL scheduling indicates one or more of a number of PRBs for DL reception from respective UL slots and PRB offset values from a start PRB for each PRB for DL reception from a UL slot.

16. One or more processing devices configured to perform operations comprising:

receiving, from a remote device, data indicating scheduling information for slots of a frame structure, each slot including a physical resource block (PRB), wherein each slot of the frame structure occupies a frequency bandwidth and an associated time in the frame structure, the scheduling information indicating a switching gap of the frame structure for switching from downlink (DL) to uplink (UL) transmission;

based on the scheduling information, determining that the switching gap is smaller than a threshold value to cause a collision between UL transmission and DL reception for a slot; and based on the determining, resolving the collision based on the UL transmission and the DL reception based on a predefined priority of the UL transmission and DL reception.

17. The one or more processing devices of claim 16, wherein DG PDSCH collides with CG PUSCH, the operations further comprising:

resolving the collision based on a priority rule specifying that a synchronization signal block (SSB) is prioritized over configured a UL transmission and a dynamically scheduled UL transmission.

18. The UE one or more processing devices of claim 17, wherein the priority rule specifies that when a gap of a last symbol of a CORESET for DL DCI to a first symbol of the CG PUSCH is longer than a processing time $T_{Proc,2}$, the PUSCH is dropped.

19. A method performed for cross division duplex (XDD) operations, the method comprising:

receiving, from a remote device, scheduling information for slots of a frame structure, each slot including a physical resource block (PRB), wherein each slot of the frame structure occupies a frequency bandwidth and an associated time in the frame structure, the scheduling information indicating a transmission direction for each slot of the frame structure, a number of PRBs for downlink (DL) reception that are changed from respective uplink slots, and PRB offset value from a start PRB for each of the PRBs for downlink reception; and based on the scheduling information, determining a transmission direction for a slot of the frame structure as being an uplink (UL) slot or a downlink (DL) slot operating in XDD mode.

20. The method of claim 19, wherein determining the transmission direction for a slot of the frame structure comprises resolving a conflict between scheduled UL transmission and DL reception for the slot, and wherein resolving the conflict comprises:

determining that a scheduled physical downlink control channel (PDCCH) monitoring occasion conflicts with at least one of a physical uplink shared channel (PUSCH), a physical uplink control channel (PUCCH), a sounding reference signal (SRS), or a physical random access channel (PRACH) transmission in the slot operating in XDD mode; and assigning the transmission direction to the slot based on the conflict.

* * * * *

UNITED STATES PATENT AND TRADEMARK OFFICE
CERTIFICATE OF CORRECTION

PATENT NO. : 12,335,201 B2
APPLICATION NO. : 17/789756
DATED : June 17, 2025
INVENTOR(S) : Chunxuan Ye et al.

Page 1 of 1

It is certified that error appears in the above-identified patent and that said Letters Patent is hereby corrected as shown below:

In the Claims

Column 28, Line 30, In Claim 18, before "one" delete "UE".

Signed and Sealed this
Nineteenth Day of August, 2025

Coke Morgan Stewart
*Acting Director of the United States Patent and Trademark Office*